(12) United States Patent
Moerman

(10) Patent No.: US 9,470,531 B2
(45) Date of Patent: Oct. 18, 2016

(54) VEHICLE POSITIONING SYSTEM

(71) Applicant: NXP B.V., Eindhoven (NL)

(72) Inventor: Cornelis Marinus Moerman, Waalre (NL)

(73) Assignee: NXP B.V., Eindhoven (NL)

( * ) Notice: Subject to any disclaimer, the term of this patent is extended or adjusted under 35 U.S.C. 154(b) by 57 days.

(21) Appl. No.: 14/284,082

(22) Filed: May 21, 2014

(65) Prior Publication Data

US 2014/0350848 A1 Nov. 27, 2014

(30) Foreign Application Priority Data

May 24, 2013 (EP) .................................... 13169237

(51) Int. Cl.
*G01S 19/48* (2010.01)
*G01C 21/20* (2006.01)
*G01S 5/00* (2006.01)
*G01S 5/14* (2006.01)

(52) U.S. Cl.
CPC ............. *G01C 21/20* (2013.01); *G01S 5/0072* (2013.01); *G01S 5/14* (2013.01); *G01S 19/48* (2013.01)

(58) Field of Classification Search
None
See application file for complete search history.

(56) References Cited

U.S. PATENT DOCUMENTS

| 5,365,447 | A | * | 11/1994 | Dennis | G01S 19/07 342/352 |
| 5,420,594 | A | * | 5/1995 | FitzGerald | G01S 19/41 342/357.31 |
| 6,944,541 | B2 | * | 9/2005 | Pasturel | G01S 19/20 342/357.29 |
| 7,948,437 | B2 | | 5/2011 | Torimoto et al. | |
| 8,787,943 | B2 | | 7/2014 | Ghinamo | |
| 8,890,746 | B2 | * | 11/2014 | Alizadeh-Shabdiz | G01S 5/0263 342/357.23 |
| 8,948,392 | B2 | * | 2/2015 | Chassagne | G01S 1/042 380/270 |
| 9,060,341 | B2 | * | 6/2015 | Karr | G01S 1/026 |
| 2004/0193372 | A1 | | 9/2004 | MacNeille et al. | |
| 2009/0167513 | A1 | * | 7/2009 | Hill | G01S 5/0072 340/435 |
| 2011/0140950 | A1 | | 6/2011 | Andersson | |
| 2011/0244891 | A1 | | 10/2011 | Ghinamo | |
| 2012/0026036 | A1 | * | 2/2012 | Shaw | G01S 5/0072 342/357.31 |
| 2014/0120943 | A1 | * | 5/2014 | Shima | G01S 19/14 455/456.1 |

FOREIGN PATENT DOCUMENTS

| CN | 101438185 A | 5/2009 |
| CN | 102 023 304 A | 4/2011 |
| CN | 102209906 A | 10/2011 |

OTHER PUBLICATIONS

Intelligent Transport Systems Vehicular Communications; Draft ETSI TS 102 637-2 VO.06; 39 pages (Aug. 2012).
Extended European Search Report for Application 13169237.8 (Oct. 25, 2013).
China Office Action for Counterpart appl. No. 201410217469.X (Jun. 1, 2016).

* cited by examiner

*Primary Examiner* — Redhwan k Mawari
*Assistant Examiner* — Edward Torchinsky

(57) ABSTRACT

A vehicle positioning system (200) comprising a receiver (206) configured to receive information representative of signals (222) transmitted by one or more other vehicles (220), wherein each signal (222) comprises data relating to the position of the associated other vehicle (220); and a processor (207) configured to process the data relating to the position of each other vehicle to determine an estimate of the position of the vehicle positioning system.

15 Claims, 2 Drawing Sheets

VEHICLE POSITIONING SYSTEM

CROSS-REFERENCE TO RELATED APPLICATIONS

This application claims the priority under 35 U.S.C. §119 of European patent application no. 13169237.8, filed on May 24, 2013, the contents of which are incorporated by reference herein.

The present disclosure relates to the field of vehicle positioning systems and in particular, although not necessarily, vehicle to vehicle communication systems that can be used in vehicle positioning systems.

According to a first aspect of the invention there is provided a vehicle positioning system comprising:
- a receiver configured to receive information representative of signals transmitted by one or more other vehicles, wherein each signal comprises data relating to the position of the associated other vehicle; and
- a processor configured to process the data relating to the position of each other vehicle to determine an estimate of the position of the vehicle positioning system.

Such a vehicle positioning system can be particularly advantageous if satellite positioning is not possible, for example if a line of sight to satellites is blocked or if GPS signals are interfered with.

The signals may conform to the IEEE 802.11 standard, optionally the IEEE 802.11p standard.

The receiver may be configured to receive information representative of a plurality of signals transmitted by a plurality of other vehicles. The processor may be configured to average the data relating to the position of each of the plurality of other vehicles to determine the estimate of the position of the vehicle positioning system.

The receiver may be configured to receive information representative of signals transmitted by a plurality of other vehicles, wherein each signal further comprises data relating to the distance between the associated other vehicle and the vehicle positioning system. The processor may be configured to process the data, relating to the position of each other vehicle and the distance between the vehicle positioning system and each other vehicle, to determine an estimate of the position of the vehicle positioning system.

The vehicle positioning system may further comprise a satellite positioning system configured to receive information representative of received satellite signals. The processor may be further configured to determine whether or not the satellite positioning system is receiving satellite signals. If no satellite signals are being received then the system may use the estimate of the position of the vehicle positioning system as the location of the vehicle positioning system instead of using the satellite positioning system.

The processor may be configured to:
- determine a first location of the vehicle positioning system in accordance with the received satellite signals;
- compare the first location of the vehicle positioning system with the estimate of the position of the vehicle positioning system; and
- if the difference between the first location and the estimate of the position of the vehicle positioning system is greater than a threshold value, then use the estimate of the position of the vehicle positioning system as the location of the vehicle positioning system instead of using the satellite positioning system.

The processor may be further configured to provide the estimate of the position of the vehicle positioning system to a remote server when the estimate of the position of the vehicle positioning system is used as the location of the vehicle positioning system instead of the satellite positioning system, or when the processor receives a remote request, or an event such as a tamper event associated with the vehicle is detected.

The processor may be configured to update the estimate of the position of the vehicle positioning system based on information representative of signals transmitted by one or more additional other vehicles. The processor may be configured to update the estimate of position according to a Bayesian inference.

The receiver may be configured to receive information representative of signals transmitted by one or more stationary roadside devices. Each signal may comprise data relating to the position of the associated stationary roadside device. The processor may be configured to process the data relating to the position of each stationary roadside device to provide the estimate of the position of the vehicle positioning system.

There may be provided an integrated circuit comprising any vehicle positioning system disclosed herein.

According to a further aspect of the invention there is provided a method for determining the position of a vehicle, comprising:
- receiving information representative of signals transmitted by one or more other vehicles, wherein each signal comprises data relating to the position of the associated other vehicle;
- determining an estimate of the position of the vehicle by processing the data relating to the position of each other vehicle.

There may be provided a computer program, which when run on a computer, causes the computer to configure any apparatus, including a vehicle positioning system or integrated circuit disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

There may be provided a vehicle comprising any vehicle positioning system disclosed herein.

BRIEF DESCRIPTION OF THE DRAWINGS

A description is now given, by way of example only, with reference to the accompanying drawings, in which.

DETAILED DESCRIPTION

Figure 1:
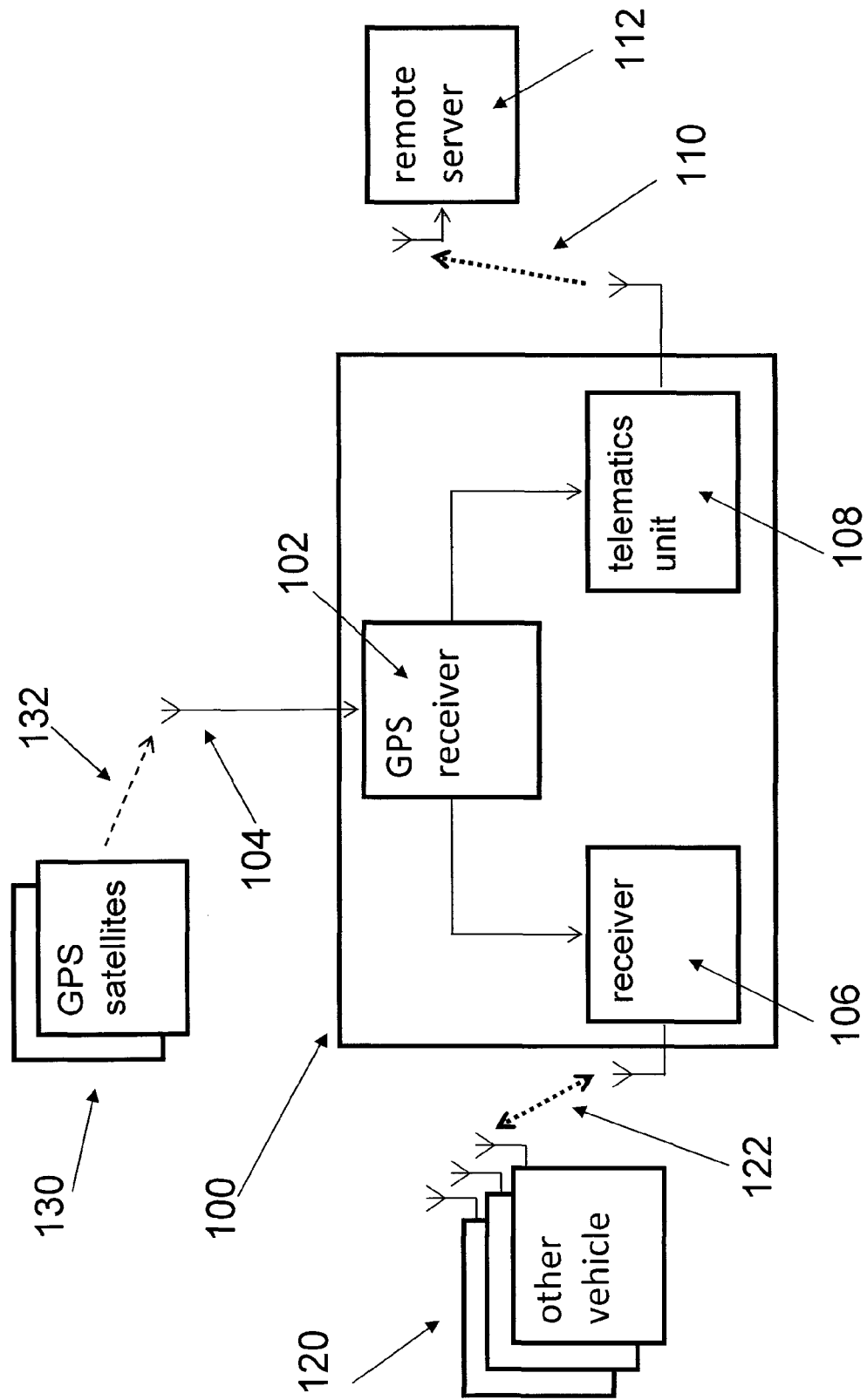
FIG. 1 illustrates schematically a vehicle positioning system that operates by using satellite positioning technology.

FIG. 1 illustrates a vehicle positioning system 100 that comprises a Global Positioning System (GPS) receiver 102.

As is well known in the art, the GPS receiver 102 functions by using an antenna 104 to receive signals 132 from a plurality of satellites 130 orbiting the Earth, that provide the GPS receiver 102 with information about its absolute location.

The system 100 further comprises a receiver 106 configured to transmit and receive signals 122 with a plurality of other vehicles 120. Such signals 122 may, for example, be radio signals and may conform to the Wi-Fi standard, that is, the IEEE 802.11 standard. The signals 122 may conform to a car-to-car networking standard such as IEEE 802.11p, or IEEE 1609, or alternatively to the European Telecommunications Standards Institute TC ITS (Intelligent Traffic Systems) standard.

The information provided by each signal 122 may include the velocity and location of the vehicle from which it was transmitted. In particular, the receiver 106 may transmit its location and velocity based on information provided by the GPS receiver 102. Typically, vehicle-to-vehicle communication systems may broadcast their own position, speed and direction on a periodic basis, such as several times per second (see for example the ETSI TS 102 637-2 standard relating to CAM or Cooperative Awareness Messages). This position and velocity information may be used to operate, for example, a collision avoidance system to improve road safety.

The receiver 106 may also receive signals transmitted by stationary roadside infrastructure. Such signals may for example provide information related to location based services, such as nearby retail outlets.

The system 100 further comprises a telematics unit 108 configured to receive satellite positioning information from the GPS receiver 102. The telematics 108 unit may be configured to display location information to a user of the vehicle positioning system 100, for example a driver of a vehicle with which the system 100 is associated. The telematics unit 108 may further be configured to transmit signals 110, comprising this location information, to a remote server 112. The signals 110 may be transmitted by GSM mobile phone technology. Information about the location of the system 100 may be used by the server 112 to operate a road tolling system, to inform an insurance company about the behaviour of the vehicle, or in the event that the vehicle is stolen to inform law enforcement authorities about the location of the vehicle as non-limiting examples.

Figure 2:
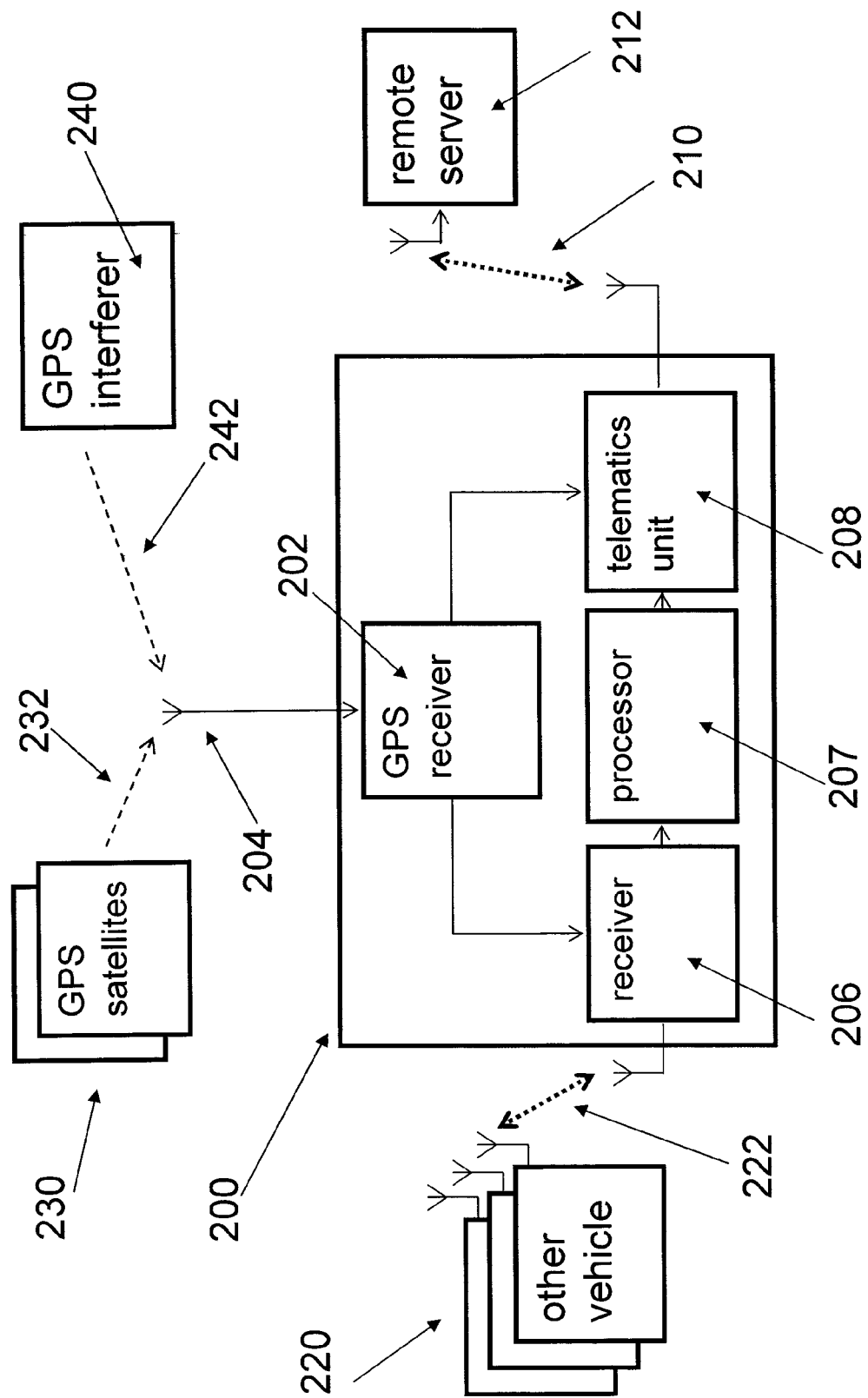
FIG. 2 illustrates schematically a vehicle positioning system that can operate by using satellite positioning technology and can also operate by using a vehicle-to-vehicle communications system.

FIG. 2 illustrates another vehicle positioning system 200. Features common to both FIGS. 1 and 2 will not necessarily be described again with reference to FIG. 2.

It will be appreciated that the GPS receiver 202 shown in FIG. 2 may comprise any form of satellite positioning system, for example the Russian GLONASS or European Galileo system.

In addition to the features of FIG. 1, the system 200 of FIG. 2 also includes a processor 207 that can receive information from a receiver 206. Optionally, the processor 207 can provide information to a telematics unit 208.

The receiver 206 is configured to receive information representative of signals 222 transmitted by one or more other vehicles 220 in the same way as the receiver of FIG. 1. Each such signal comprises data relating to the position of the corresponding vehicle. The signals 222 may preferably conform to a vehicle-to-vehicle communication standard, such as ETSI TC ITS standards, IEEE 1609 or IEEE 802.11p, that comprises accurate position information. Typically, these signals have a limited range of about 500 m to 1,000 m. The receiver 206 is configured to provide the information relating to the position of each of the other vehicles 220 to the processor 207.

The processor 207 is configured to process the data relating to the position of each of the other vehicles 220 to determine an estimate of the position of the system 200. The processor 207 can be considered as using the information from the receiver 206 (which may be an ITS receiver) for determining the vehicle's own position based on the position reported from surrounding similarly equipped (for example ITS-equipped) systems such as those in the vehicles 220 of FIG. 2.

The information relating to the position of each other vehicle may be the actual position of each other vehicle, as determined for example by each other vehicle's GPS. The process of combining the positions of the other vehicles may be an averaging process. The averaging process may be a determination of a point in space that minimizes the sum of the distances from the position of each other vehicle to the point concerned. The position of the point concerned may then be identified as the estimated position for the system 200.

The averaging process may be a weighted averaging process. For example, the averaging may be weighted according to the power of each of the received signals 222. Alternatively or additionally, the average may be weighted according to the velocity of the other vehicles, or according to any other data that may be contained in the signals 222.

The process of combining the positions of the other vehicles may additionally include using estimates of distances from the system 200 to each of the other vehicles 220. The process of using a plurality of known positions and distances from those known positions to an unknown location, to determine the position of the unknown location, is well known to those skilled in the art as trilateration. In the case that the other vehicles 220 are clustered in an area remote from the system 200, an averaging process could provide an inaccurate estimate indicating that the system 200 is within the cluster of other vehicles. However, using trilateration, it is possible to provide an accurate estimate of the position of the system that is outside the area that contains all of the other vehicles.

Determining the distance between the system 200 and another vehicle 220 may be achieved in a variety of different ways. For example, a signal 222 received from another vehicle 220 may include data providing the time that is was transmitted. This can be used together with the time that the system 200 receives the signal 222 to estimate the distance between the other vehicle 220 and the system 200. Alternatively, the signal 222 received from another vehicle 220 may contain data relating to the strength of the signal 222 being transmitted. This can be used together with the strength of the received signal and a model of how signal strength is attenuated as a function of distance to estimate the distance between the other vehicle 220 and the system 200. As a further alternative, the system 200 may transmit signals 222 to the other vehicles 220. The other vehicles 220 may be configured to measure the strength of the received system signal and to include data relating to the measured system signal strength in signals 222 transmitted back to the receiver 206 in the system 200. The data relating to the measured system signal strength together with a model of how signal strength attenuates as a function of distance may be used to estimate the distance between the other vehicle 220 and the system 200. Also, a plurality of estimates of the distance between the system 200 and another vehicle 220 may be combined together to provide an average estimate of distance with superior accuracy. Each of the above examples can be considered as using information indicative of the distance between the associated other vehicles 220 and the vehicle positioning system 200.

The process of estimating the distance between the other vehicle 220 and the system 200, based on a model of signal attenuation as a function of distance, together with the measured strength of signals, either received by the receiver 206 or received by the other vehicles 220, may be based on a constrained optimization process such as a curve fitting process. By obtaining a best fit of the model of signal attenuation to the measured signal strengths it is possible to determine an estimate of the distance from the system 200 to each other vehicle 220.

If the receiver 206 receives signals from a sufficient number of other vehicles, then the processor 207 may be configured to perform a plurality of trilateration processes with data relating to different sets of other vehicles, and to process the plurality of associated estimates of position by averaging them to provide an estimate of position with superior accuracy.

The other vehicles 220 may be configured to transmit the signals 222 including their positions and other data on a periodic basis, for example several times per second, such that the receiver 206 similarly receives such signals 222 several times per second. Having estimated the position of the system from an initial set of signals, the system 200 may be configured to update the estimate of its position based on additional received signals. It will be appreciated that such additional signals may be received from vehicles from which signals have already been received or from other vehicles that were previously not transmitting signals or were out of range of the system 200.

The process of updating the estimate of position may be performed by using a range of different statistical techniques. For example, as new signals are received, updating may be performed by Bayesian inference. The process of updating may therefore render the estimate progressively more accurate, in addition to updating the position as the system 200 moves from place to place.

The processor 207 may be configured to provide the estimate of position to a telematics unit 208. The telematics unit 208 may be configured to transmit or display the estimate of position in the same way that the location information is used by the telematics unit of FIG. 1.

The telematics unit 208 may also be configured to receive satellite positioning information from the GPS receiver 202. The telematics unit 208 may be configured to display the estimate of position from the processor 207 in preference to the satellite positioning information if the GPS receiver 202 does not provide any satellite positioning information. The location of the system 200 determined from information received from the GPS receiver 202 may be referred to as a first location. The telematics unit 208 may be configured to compare the estimate of position with the first location and to provide the estimate of position in preference to the first location if the comparison determines a significant discrepancy. For example, if the difference between the first location and the estimate of the position of the vehicle positioning system is greater than a threshold value, then the estimate of the position of the vehicle positioning system as the location of the vehicle positioning system instead of using the satellite positioning system. the threshold may be, for example, 50 m, 100 m 200 m, 500 m or 1,000 m.

The GPS receiver 202 may fail to provide positioning information if interference to the satellite positioning signals 232 occurs. For example, the signals 232 may be blocked if the system 200 enters a tunnel or a building, or by the 'urban canyon' effect where tall buildings obstruct the system's 200 view of the GPS satellites 230. Such "accidental blocking" might for example occur in parking garages, where concrete or metal roofs effectively shield the relatively weak, vertically received, GPS satellite signals. Examples disclosed in this document can overcome problems experienced by blocking of the vertically received signals (such as from GPS satellites) by using generally horizontally received signals 222 from other vehicles 220 to determine the location of the system 200.

The telematics unit 208 and/or the processor 207 may determine whether or not the GPS receiver 202 is receiving satellite signals, and if no satellite signals are being received then the estimate of the position of the vehicle positioning system is used as the location of the vehicle positioning system 200 instead of information determined from the GPS receiver 202.

Also, the satellite signals 232 may be subject to active interference by a GPS interferer 240 transmitting a jamming signal 242. Such GPS interferers 240 may be used by thieves attempting to steal a vehicle in order to prevent the system 200 from communicating its position to law enforcement authorities. A GPS interferer 240 may also be used by a vehicle owner attempting to avoid road tolling. A GPS interferer 240 may either: i) prevent the GPS receiver 202 from providing any positioning information; or ii) prevent the GPS receiver 202 from providing accurate information. The first form of interference may be accounted for by the system 200 of FIG. 2 as it can automatically switch to an estimate of position determined in accordance with the signals 222 received from the other vehicles 220 when the GPS location is not available. The second form of interference may be accounted for by detecting when a significant discrepancy exists between the estimate of position and the satellite positioning information, as discussed above.

The telematics unit 208 may be configured to provide the estimate of position to a remote server 212 by transmitting a signal 210. The signal 210 may be a GSM signal transmitted by a cellular telephone associated with a vehicle in which the system 200 is fitted. For example, any available eCall functionality may be used.

The telematics unit 208 may be configured to transmit the signal 210 in response to a request received from a remote server 212 or when the satellite positioning information is either not available or is subject to a significant discrepancy relative to the estimate of position. The remote request may be initiated, for example, if a vehicle associated with the system 200 is reported stolen or if a tamper or other relevant event is detected by the vehicle's on-board computer. In this case, even if the GPS signals are blocked or jammed the system 200 may still be able to provide an estimate of its position to the remote server 212, to enable recovery of the vehicle associated with the system 200 by law enforcement authorities.

It will be appreciated that one or more of the receiver 206, the processor 207 and the telematics unit 208 may be contained in the same integrated unit, for example a single integrated circuit. Any such integrated circuit may be configured to implement the PHY and MAC layers of an associated communications system.

In addition to receiving signals 222 from other vehicles 220, the receiver 206 may also be configured to receive signals transmitted by stationary roadside infrastructure. Such signals may for example conform to the Decentralized Environmental Notification Message (DENM) standard according to ETSI TS 102 637-2 V1.1.1. The roadside infrastructure may be intended to enable operation of a road tolling system or may relate to the availability of location based services. A plurality of such pieces of infrastructure may transmit position information, from which the system 200 may estimate its position in the same way as described above with reference to the signals 222 received from other vehicles 220. It will be appreciated that the system 200 may use a combination of signals transmitted by both other vehicles and roadside infrastructure to estimate its position.

When roadside infrastructure provides position information to the system 200, the processor 207 may be configured to combine that information with position information from other vehicles according to a weighted average. Such a weighted average may weight the position information from roadside infrastructure more heavily than that from other vehicles.

Examples disclosed herein can be particularly advantageous on occasions when GPS information is not available because an alternative source of positioning information is available that uses information received from other vehicles. In one example, an advantage is provided over satellite-only positioning systems as a second method for absolute position determination is provided, based on 802.11p car-to-car communication, which can be more robust than GPS reception. Such car-to-car communication signals can be stronger than GPS signals, in some instances multiple orders of magnitude stronger. Therefore, the car-to-car communication signals can be readily detectable.

Additional positioning systems are known, for example dead reckoning systems based on wheel sensor information. However, such systems provide relative positioning information only and, unlike the absolute positioning information of a satellite based system, accuracy is quickly lost as distance travelled increases. Furthermore, if a vehicle is stolen and loaded onto a trailer its wheels may not move at all and so a dead reckoning system may not detect any change in position. Examples disclosed herein can be considered as providing an alternative to satellite positioning systems that maintains accuracy over a broader range of circumstances than dead reckoning systems. Also, database or look-up table access may not be required to associate received signals with the location of their origin, as the signals themselves contain such location information, which might otherwise be required for other positioning systems.

The invention claimed is:

1. A vehicle positioning system comprising:
   a receiver configured to receive information representative of signals transmitted by one or more other vehicles, wherein each signal comprises data relating to the position of the associated other vehicle;
   a processor configured to process the data relating to the position of each other vehicle to determine an estimate of the position of the vehicle positioning system; and
   a satellite positioning system configured to receive information representative of received satellite signals;
   wherein the processor is further configured to:
   determine a first location of the vehicle positioning system in accordance with the received satellite signals;
   compare the first location of the vehicle positioning system with the estimate of the position of the vehicle positioning system; and
   if the difference between the first location and the estimate of the position of the vehicle positioning system is greater than a threshold value, then use the estimate of the position of the vehicle positioning system as the location of the vehicle positioning system instead of using the satellite positioning system.

2. The vehicle positioning system of claim 1, wherein the signals conform to the IEEE 802.11 standard.

3. The vehicle positioning system of claim 2, wherein the signals conform to the IEEE 802.11p standard.

4. The vehicle positioning system of claim 1, wherein the receiver is configured to receive information representative of a plurality of signals transmitted by a plurality of other vehicles, and the processor is configured to average the data relating to the position of each of the plurality of other vehicles to determine the estimate of the position of the vehicle positioning system.

5. The vehicle positioning system of claim 1, further comprising:
   the receiver further configured to receive information representative of signals transmitted by a plurality of other vehicles, wherein the signals further comprise information indicative of the distance between the associated other vehicles and the vehicle positioning system; and
   the processor further configured to process the data, relating to the position of each other vehicle and the distance between the vehicle positioning system and each other vehicle, to determine an estimate of the position of the vehicle positioning system.

6. The vehicle positioning system of claim 1, further comprising:
   a satellite positioning system configured to receive information representative of received satellite signals;
   wherein the processor is further configured to determine whether or not the satellite positioning system is receiving satellite signals, and if no satellite signals are being received then use the estimate of the position of the vehicle positioning system as the location of the vehicle positioning system instead of using the satellite positioning system.

7. The vehicle positioning system of claim 6, wherein the processor is further configured to provide the estimate of the position of the vehicle positioning system to a remote server when the estimate of the position of the vehicle positioning system is used as the location of the vehicle positioning system instead of the satellite positioning system.

8. The vehicle positioning system of claim 1 wherein the processor is configured to update the estimate of the position of the vehicle positioning system based on information representative of signals transmitted by one or more additional other vehicles.

9. The vehicle positioning system of claim 8, wherein the processor is configured to update the estimate of position according to a Bayesian inference.

10. The vehicle positioning system of claim 1 wherein:
    the receiver is configured to receive information representative of signals transmitted by one or more stationary roadside devices, wherein each signal comprises data relating to the position of the associated stationary roadside device;
    the processor is configured to process the data relating to the position of each stationary roadside device to provide the estimate of the position of the vehicle positioning system.

11. An integrated circuit comprising the vehicle positioning system of claim 1.

12. A method for determining the position of a vehicle, comprising:
    receiving information representative of signals transmitted by one or more other vehicles, wherein each signal comprises data relating to the position of the associated other vehicle;

determining an estimate of the position of the vehicle by processing the data relating to the position of each other vehicle;

determine a first location of the vehicle positioning system in accordance with a set of received satellite signals from a satellite positioning system;

compare the first location of the vehicle positioning system with the estimate of the position of the vehicle positioning system; and if the difference between the first location and the estimate of the position of the vehicle positioning system is greater than a threshold value, then use the estimate of the position of the vehicle positioning system as the location of the vehicle positioning system instead of using the satellite positioning system.

13. A computer program, which when run on a computer, causes the computer to configure the vehicle positioning system, in accordance with the method of claim 12.

14. A vehicle comprising the vehicle positioning system of claim 1.

15. A vehicle positioning system comprising:

a receiver configured to receive information representative of signals transmitted by one or more other vehicles, wherein said other vehicles are configured to be in current communication with a satellite positioning system and wherein each signal comprises data relating to the position of the associated other vehicles;

a processor configured to process the data relating to the position of each other vehicle to determine an estimate of the position of the vehicle positioning system; and wherein the satellite positioning system configured to receive information representative of received satellite signals;

wherein the processor is further configured to:

determine a first location of the vehicle positioning system in accordance with the received satellite signals;

compare the first location of the vehicle positioning system with the estimate of the position of the vehicle positioning system; and if the difference between the first location and the estimate of the position of the vehicle positioning system is greater than a threshold value, then use the estimate of the position of the vehicle positioning system as the location of the vehicle positioning system instead of using the satellite positioning system.

* * * * *